US005752759A

United States Patent [19]

Pizzo

[11] Patent Number: 5,752,759

[45] Date of Patent: May 19, 1998

[54] ILLUMINATED KNOB ASSEMBLY

[75] Inventor: William C. Pizzo, Lisle, Ill.

[73] Assignee: Illinois Tool Works Inc., Glenview, Ill.

[21] Appl. No.: 812,576

[22] Filed: Mar. 7, 1997

[51] Int. Cl.[6] .................. G01D 11/28

[52] U.S. Cl. .................. 362/26; 362/30; 362/32; 362/293

[58] Field of Search .................. 362/26, 29, 30, 362/32, 100, 85, 86, 252, 293

[56] References Cited

U.S. PATENT DOCUMENTS 5,171,080 12/1992 Bathurst .................. 362/23
5,335,148 8/1994 Tominaga .................. 362/26

*Primary Examiner*—Stephen F. Husar
*Attorney, Agent, or Firm*—Kane,Dalsimer,Sullivan, Kurucz, Levy, Eisele and Richard, LLP

[57] ABSTRACT

The control knob includes a chamber into which a translucent polycarbonate jewel light pipe assembly of a first color, such as blue, and a translucent polycarbonate jewel cap of a second color, such as white, are inserted. The jewel cap is engaged against said jewel light pipe assembly and includes a bulbous portion which protrudes or stands proud through an axially oriented slot in the sidewalls of the control knob thereby forming an indicator for the control knob. In ambient illumination, such as during the day, the indicator appears to be the color of the jewel cap, such as white. However, when the dashboard is electrically illuminated, such as during the night, the illumination is collected by the jewel light pipe, and the color of the jewel light pipe assembly, such as blue or blue-green, is projected through the cap assembly and the indicator appears to be blue or blue green.

12 Claims, 7 Drawing Sheets

ILLUMINATED KNOB ASSEMBLY

BACKGROUND OF INVENTION

1. Field of Invention

This invention pertains to a control knob, particularly for automotive applications, with an indicator portion which appears illuminated at night to a preselected color but which remains white during the day.

2. Description of the Prior Art

In the prior art, control knobs, particularly control knobs in automotive applications, have had position indicators for indicating the rotational position of the knob. While paints and inks have frequently been used to provide such an indicator, this solution has not been resistant to abrasion. U.S. Pat. No. 5,450,653 entitled "Composite Knob with an Insertable Position Indicator" issued on Sep. 19, 1995 to Howie, Jr. discloses a composite knob with an insertable position indicator which would be more resistant to abrasion than simple paints or inks. The position indicator has a color contrasting to that of the knob. However, this indicator does not provide a first color, such as white, during the daytime, and a second distinct color, such as blue, during the nighttime.

U.S. Pat. No. 5,050,269 entitled "Control Knob" issued on Sep. 24, 1991 to Engstrom et al. discloses a control knob, apparently for a portable telephone or "walky-talky" type device, with an outer portion of reduced hardness molded over an inner portion with a blade portion extending through the outer portion to provide an indicator. This does not appear to provide for different colors of the indicator during daytime and nighttime.

U.S. Pat. No. 5,518,561 entitled "True Color Day-Night Graphics and Method of Assembly" issued on May 21, 1996 to Rosa discloses a display panel with a light-emitting electroluminescent portion, but does not relate to control knobs, particularly for automotive applications.

Other references of interest include U.S. Pat. No. 5,469,758 issued on Nov. 28, 1995 to Howie, Jr.; U.S. Pat. No. 5,259,267 issued on Nov. 9, 1993 to Jurewicz; U.S. Pat. No. 5,303,612 issued on Apr. 19, 1994 to Odom et al.; U.S. Pat. No. 2,753,911 issued on Jul. 10, 1956 to Haslett; and U.S. Pat. No. 273,685 issued on Mar. 6, 1883 to Huntley.

Additionally, U.S. patent application Ser. No. 08/746,989 entitled "Control Knob" was filed on Nov. 19, 1996 on behalf of the present assignee.

OBJECTS AND SUMMARY OF THE INVENTION

It is therefore an object of this invention to provide a reliable indicator for a control knob, particularly for automotive applications.

It is therefore a further object of this invention to provide an indicator for a control knob, the indicator being a first color, such as white, during the day, and a second color, such as blue, during the night when illuminated.

It is therefore a further object of this invention to provide an indicator for a control knob, particularly for automotive applications, which is simple and inexpensive to construct and install.

These and other objects are attained by a control knob which includes a chamber into which a jewel light pipe assembly engaged to a jewel cap assembly is inserted. The jewel cap includes a portion which extends or protrudes through a slot in the cylindrical sidewalls of the control and in a portion of the front of the control knob to form the indicator. The jewel cap is translucent, typically white, so that the indicator appears white during daytime. However, the jewel light pipe assembly is translucent and of a second color, such as blue or "ice blue", so that when the knob is illuminated from behind, such as the nighttime, when the dashboard is electrically illuminated, part of this light is transmitted through the jewel light pipe assembly and out the jewel cap so that the indicator appears as a blue color.

BRIEF DESCRIPTION OF THE DRAWINGS

Further objects and advantages of the invention will become apparent from the following description and claims, and from the accompanying drawings, wherein:

DETAILED DESCRIPTION OF THE PREFERRED EMBODIMENT

Figure 1:
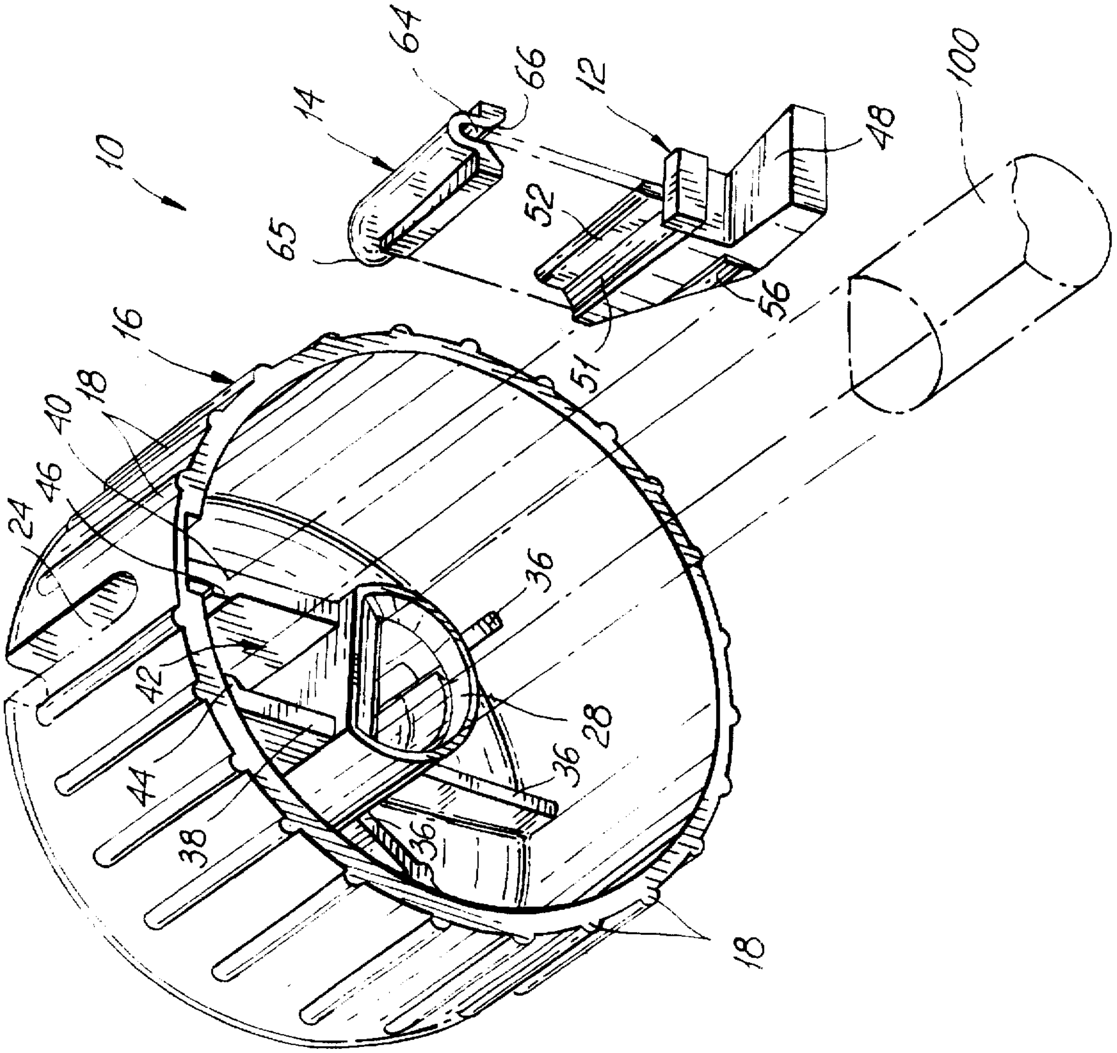
FIG. 1 is an exploded rear view, in perspective, of the control knob, the jewel light pipe assembly and the jewel cap of the present invention.
Figure 2:
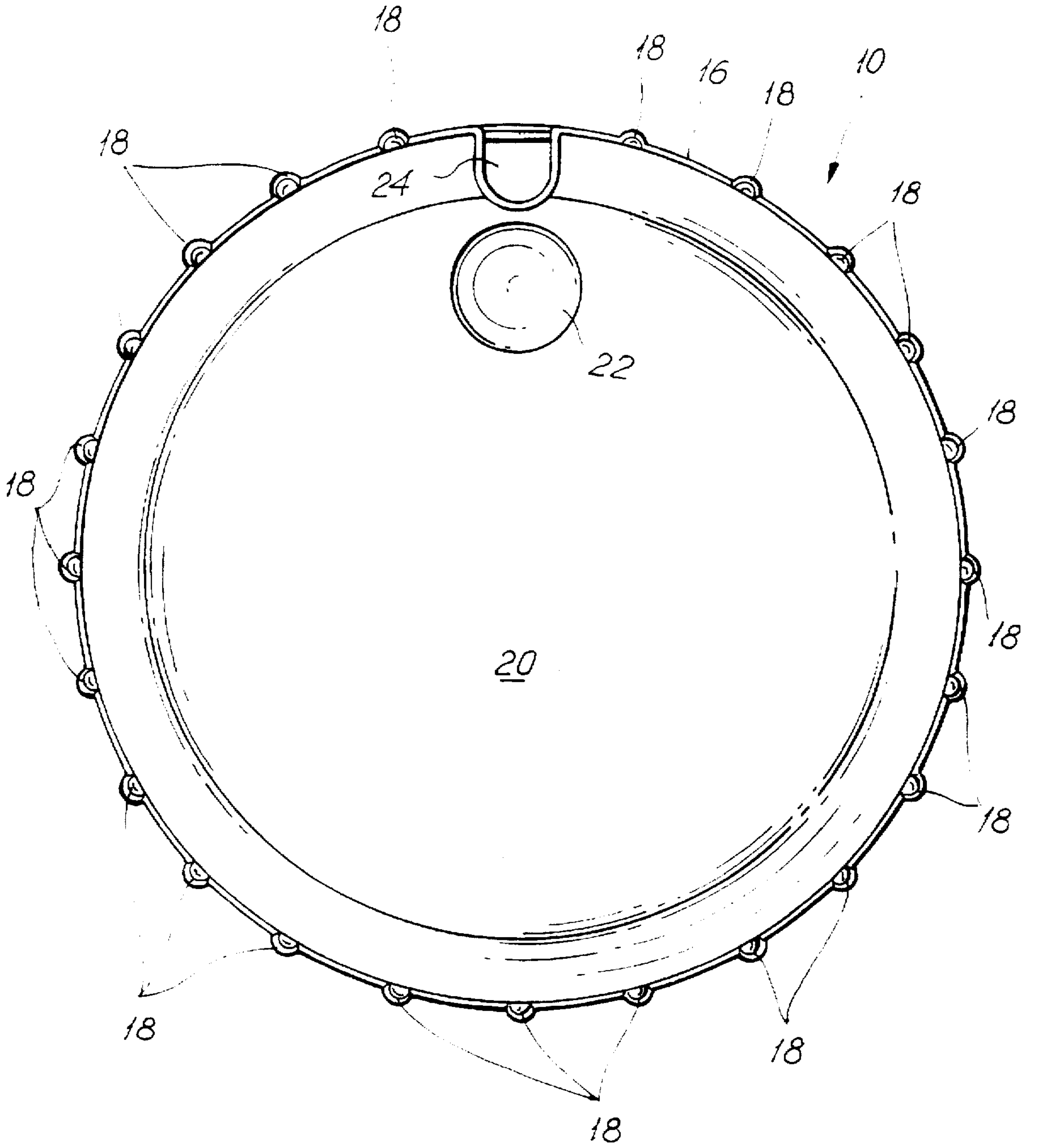
FIG. 2 is a front plan view of the control knob of the present invention.

Referring now to the drawings in detail wherein like numerals refer to like elements throughout the several views, one sees that FIG. 1 is an exploded rear view of the control knob 10, jewel light pipe assembly 12 and jewel cap 14 of the present invention. As shown in FIGS. 1 and 2, the control knob 10 includes a cylindrical shell 16 with undulations 18 spaced about the periphery thereof. Undulations 18 allow the user to grasp firmly and rotate control knob 10.

Figure 5:
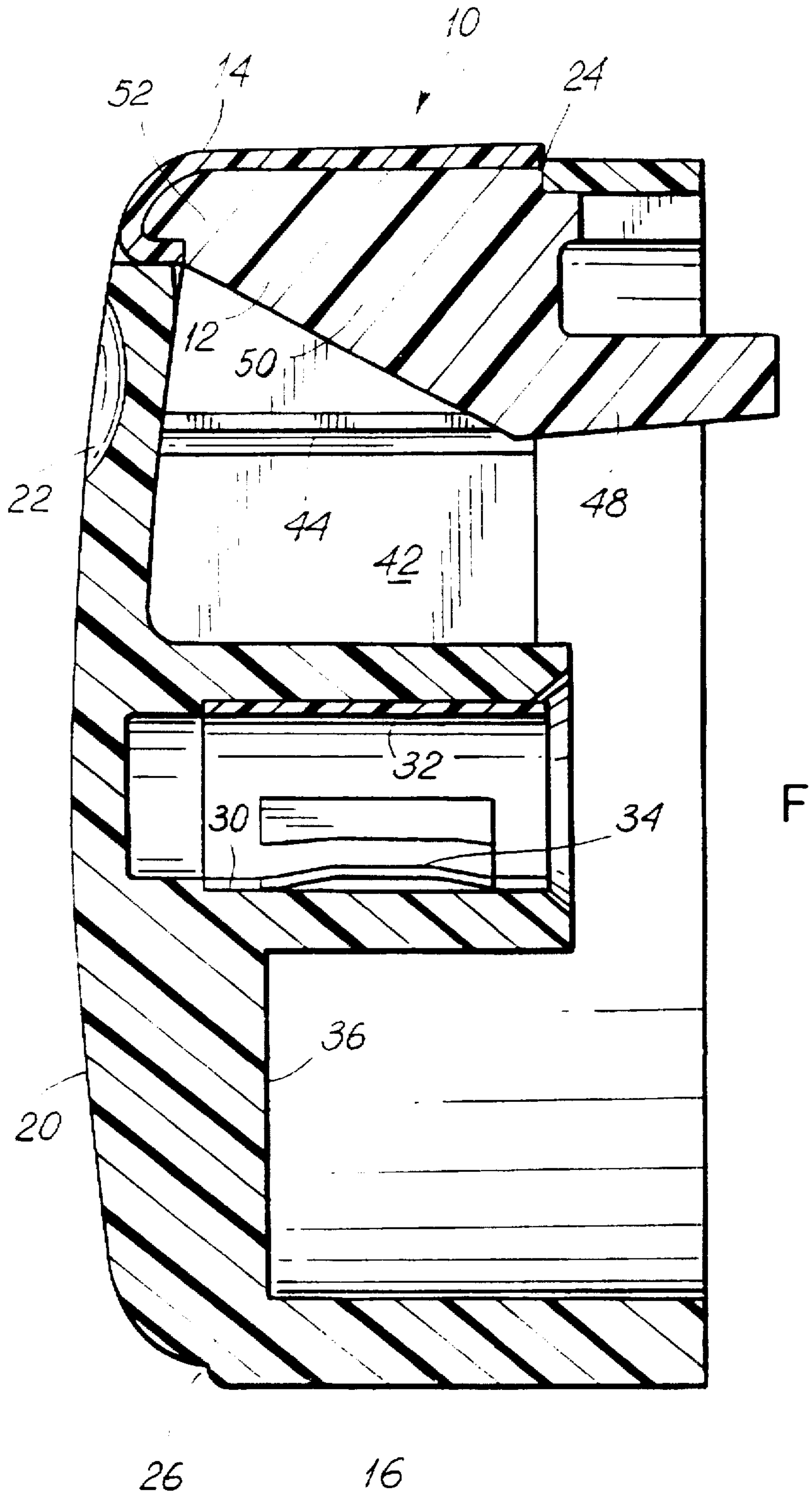
FIG. 5 is a side cross-sectional view of the control knob, assembled with the jewel light pipe assembly and jewel cap, of the present invention.

As shown in FIGS. 2 and 5, control knob 10 further includes slightly convex front circular face 20 which includes a partially spherical-type depression 22 spaced radially inward from the "twelve-o'clock" position. Depression 22 allows a user to engage and rotate control knob 10 with a single fingertip. As further shown in FIGS. 1 and 2, slot 24 is formed longitudinally along a portion of cylindrical shell 16 at the "twelve o'clock" position. Additionally, slot 24 extends into an outer peripheral portion of front face 20.

The outer circumferential edge of front circular face 20 is chamfered inwardly in order to present an edge 26 which is free of sharp surfaces and to present a clean aesthetic appearance.

Figure 3:
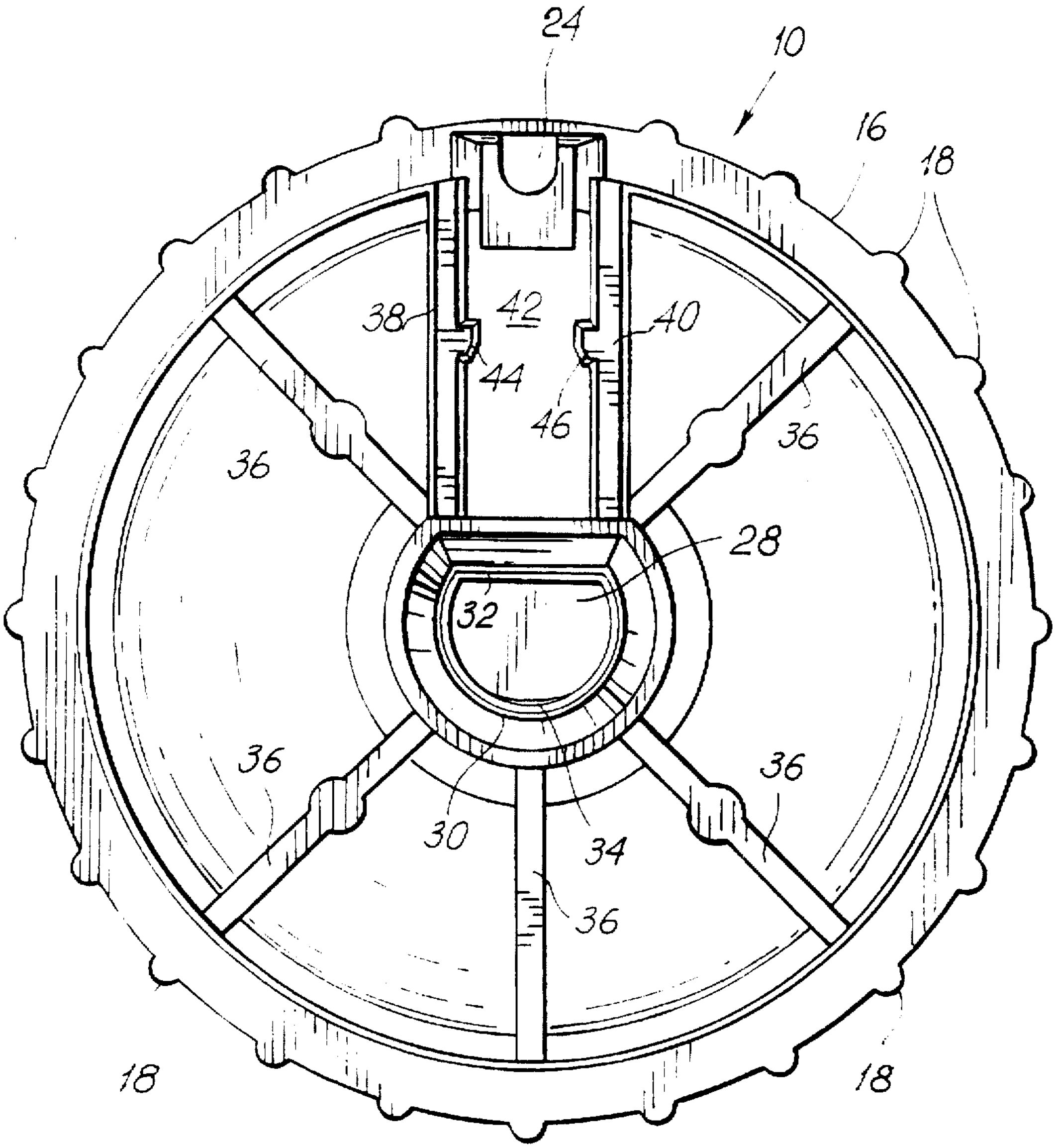
FIG. 3 is a rear plan view of the control knob of the present invention.

As shown in FIGS. 3 and 5, the center of the rear control knob 10 includes a D-shaped aperture 28 comprised of a partially circular portion 30 and a flat portion 32 for engaging a shaft 100 (shown in phantom in FIG. 1) of a similar cross section. FIG. 3 shows the use of spring clip 34 to engage control shaft 100. However, the use of spring clip 34 could be eliminated with the method of attachment disclosed in pending commonly-assigned U.S. application Ser. No. 08/746,989 entitled "Control Knob" filed on Nov. 19, 1996, the disclosure of which is incorporated herein by reference. Supporting ribs 36 extend from the interior of cylindrical shell 16 to the exterior of the walls forming D-shaped aperture 28.

Figure 4:
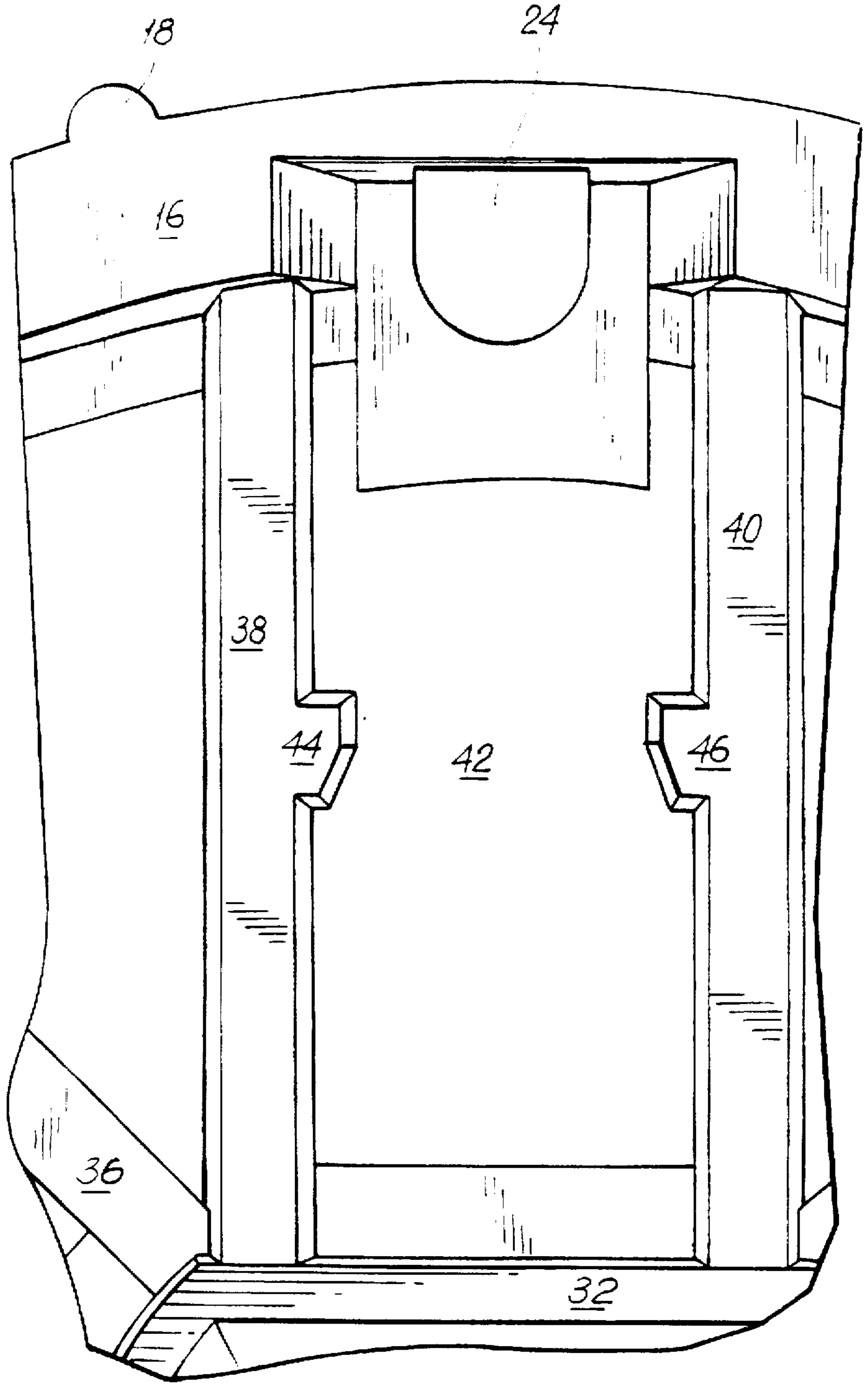
FIG. 4 is a rear view of the channel within the control knob into which the assembled jewel light pipe assembly and jewel cap fit.

As shown in FIG. 3 and more detail in FIG. 4, parallel walls 38, 40 extend from both ends of flat portion 32 of D-shaped aperture 28 to cylindrical shell 16 immediately adjacent to both sides of slot 24 thereby forming jewel light pipe channel 42. At approximately the mid-point of walls 38, 40 are inwardly extending detent ledges 44, 46, respectively.

As shown in FIG. 5, detent ledges 44, 46 are used to engage jewel light pipe assembly 12 upwardly against slot 24.

Figure 7E:
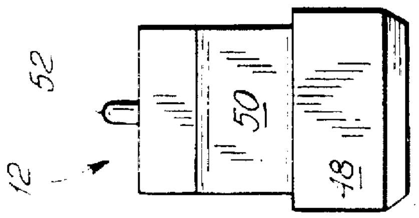
FIGS. 7A, 7B, 7C, 7D and 7E are front, top, side, bottom and rear plan views, respectively, of the jewel light pipe assembly of the present invention.
Figure 7B:
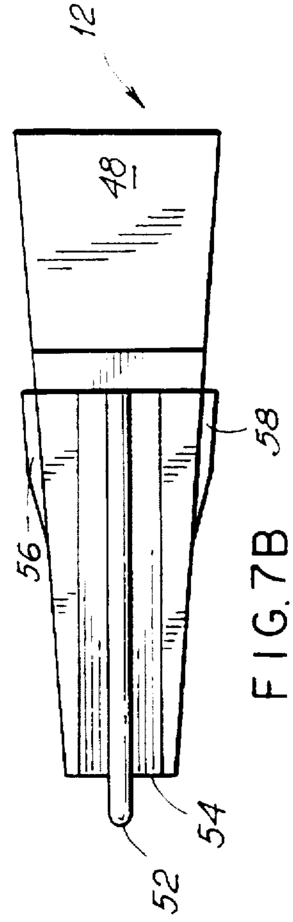
Figure 7C:
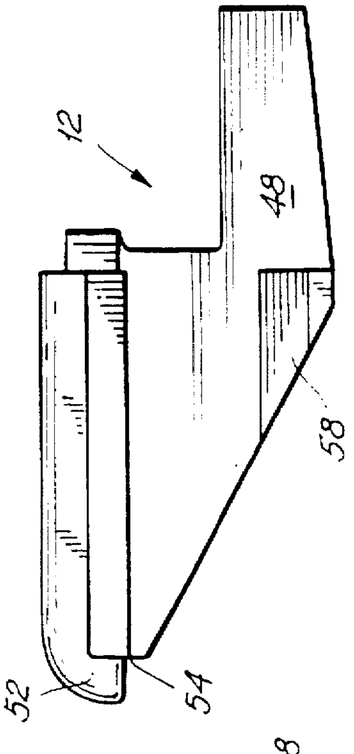
Figure 7D:
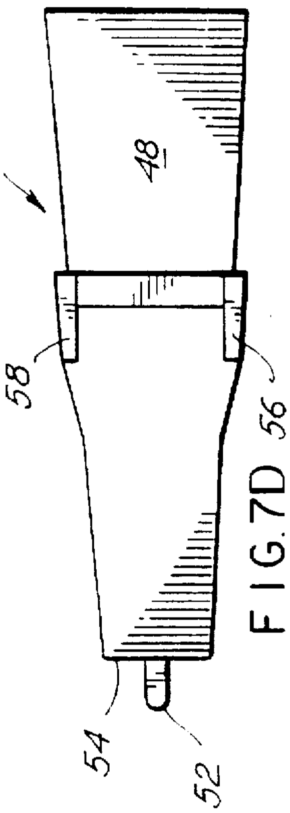
Figure 7A:
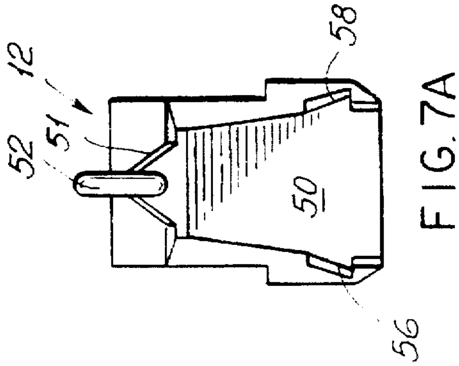

Jewel light pipe assembly 12 is shown in more detail in FIGS. 7A, 7B, 7C, 7D and 7E. Jewel light pipe assembly 12 includes tail 48 which gathers light from the illuminated dashboard (not shown) or similar control board from which the control shaft 100 extends. The light is directed upwardly from tail 48 into triangular body 50 of jewel light pipe assembly 12. Jewel light pipe assembly 12 is translucent polycarbonate and is of a first chosen color, such as blue, blue-green or "ice blue", which is to be the color of the indicator of control knob 10 during nighttime when the illumination is from the dashboard (not shown) or similar control board. The upper surface of triangular body 50 of jewel light pipe assembly 12 includes axially oriented guide 51 of triangular cross section. Ridge 52 is formed on the upper edge or apex of axially oriented triangular guide 51 (see FIG. 7A). Ridge 52 further extends over the forward tip 54 of triangular body 50. As will be described hereinafter, ridge 52 is used to engage jewel cap 14. As shown on FIGS. 7B and 7D, tail 48 is flared outwardly toward the rear portion thereof and, as shown in FIG. 5, extends beyond the rear of the control knob 10 in order to collect illumination and direct the illumination through triangular body 50 and into jewel cap 14. Additionally, as shown in FIGS. 7A, 7B and 7D, detent flanges 56, 58 extend laterally from a rearward portion of triangular body 50. Detent flanges 56, 58 engage detent ledges 44, 46 of walls 38, 40.

Figures 6A, 6B, 6C, 6D:
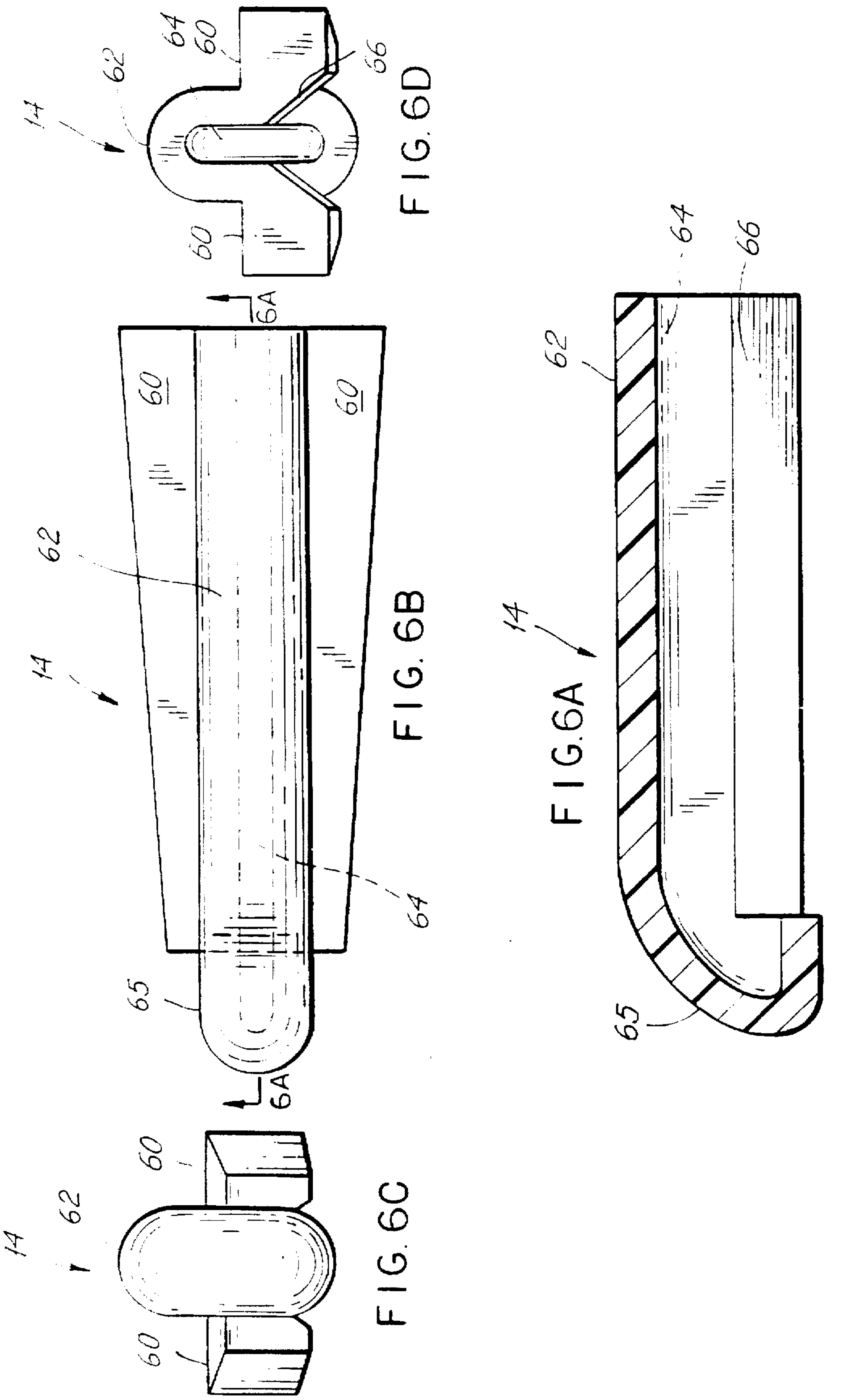
FIG. 6A, 6B, 6C and 6D are side, top, front and rear plan views, respectively, of the jewel cap of the present invention.

Jewel cap 14 is illustrated in FIGS. 6A, 6B, 6C and 6D. Jewel cap 14 is typically polycarbonate of a translucent white color. Therefore, when jewel light pipe assembly 12 is not illuminated from the dashboard or control panel (not shown), the jewel cap 14 appears to be white. However, when jewel light pipe assembly 12 is illuminated from the dashboard or control panel, the color of the jewel light pipe assembly 12 (such as blue, blue-green, or "ice blue") is projected through the jewel cap 14 and the color of the jewel light pipe assembly 12 on the jewel cap 14. As shown in FIG. 6D, jewel cap 14 includes an upper planar surface 60 which includes bulbous protrusion 62 (which is the indicator portion) formed over longitudinally oriented blind slot 64. Longitudinally oriented blind slot 64 is complementary to ridge 52 of jewel light pipe assembly 12. Longitudinally oriented blind slot 64 extends forwardly so as to include forward oriented portion 65 which is complementary to the portion of ridge 52 of jewel light pipe assembly 12 which extends over the forward tip 54 of triangular body 50 (see FIG. 7C). As further shown in FIG. 6D, jewel cap 14 includes a lower planar surface which includes triangular groove 66 which leads into longitudinally oriented blind slot 64. Likewise, triangular groove 66 is complementary to longitudinally oriented triangular guide 51 of jewel light pipe.

To install the control knob 10, jewel light pipe assembly 12 and jewel cap 14 of the present invention, the user inserts ridge 52 of jewel light pipe assembly 14 into longitudinally oriented blind slot 64 of jewel cap 14 so that the various complementary portions of the jewel light pipe assembly 12 and jewel cap 14 engage. The user then inserts the jewel light pipe assembly 12 and jewel cap 14 into jewel light pipe channel 42 of control knob 10 so that jewel light pipe assembly 12 is supported by detent ledges 44, 46 and so that bulbous protrusion 62 of jewel cap 14 extends through slot 24 of cylindrical shell 16 and protrudes or stands proud therefrom thereby forming the indicator portion of control knob 10. The control knob 10 is then inserted onto a shaft in the dashboard or other control panel.

Thus the several aforementioned objects and advantages are most effectively attained. Although a single preferred embodiment of the invention has been disclosed and described in detail herein, it should be understood that this invention is in no sense limited thereby and its scope is to be determined by that of the appended claims.

What is claimed is:

1. A control knob comprising:

a front face bounded by a cylindrical sidewall;

a longitudinally oriented slot in said cylindrical sidewall;

a chamber formed radially inwardly adjacent from said longitudinally oriented slot;

a light pipe assembly of a first preselected color engaged within said chamber; and a cap assembly of a second preselected color engaged with said light pipe assembly and including a bulbous portion extending through said longitudinally oriented slot in said cylindrical sidewall.

2. The control knob of claim 1 wherein said light pipe assembly and said cap assembly are translucent.

3. The control knob assembly of claim 2 wherein said first preselected color includes a substantial blue component and said second preselected color is substantially white.

4. The control knob assembly of claim 3 wherein said longitudinally oriented slot extends into a portion of said front face.

5. The control knob of claim 4 wherein said chamber is formed from two walls extending from a central portion of said knob to said cylindrical sidewalls.

6. The control knob of claim 5 wherein said light pipe assembly has an outwardly flaring tail which extends past a rear of said control knob for gathering illumination behind said control knob.

7. The control knob of claim 6 wherein said walls of said chamber include detent ledges for engaging said light pipe assembly.

8. The control knob of claim 7 wherein said light pipe assembly includes a longitudinally oriented ridge, and said cap assembly includes a longitudinally oriented blind slot complementary to said longitudinally oriented ridge, whereby said light pipe assembly is engaged to said cap assembly by said longitudinally oriented ridge mating with said longitudinally oriented blind slot.

9. The control knob of claim 8 wherein said longitudinally oriented ridge is formed at an apex of a longitudinally oriented guide of triangular cross section.

10. The control knob of claim 9 wherein said longitudinally oriented slot is formed at an apex of a longitudinally oriented groove of triangular cross section complementary to said longitudinally oriented guide.

11. The control knob of claim 10 wherein said light pipe assembly and said cap assembly include forward extending portions which extend into said portion of said front face into which said longitudinally oriented slot extends.

12. The control knob of claim 11 wherein said jewel light pipe assembly and said cap assembly are polycarbonate.

* * * * *